US010960622B2

(12) United States Patent
Ando

(10) Patent No.: US 10,960,622 B2
(45) Date of Patent: Mar. 30, 2021

(54) TIRE VULCANIZATION MOLD AND PNEUMATIC TIRE

(71) Applicant: TOYO TIRE & RUBBER CO., LTD., Itami (JP)

(72) Inventor: Takahiro Ando, Itami (JP)

(73) Assignee: TOYO TIRE CORPORATION, Itami (JP)

(*) Notice: Subject to any disclaimer, the term of this patent is extended or adjusted under 35 U.S.C. 154(b) by 518 days.

(21) Appl. No.: 15/822,476

(22) Filed: Nov. 27, 2017

(65) Prior Publication Data

US 2018/0178467 A1   Jun. 28, 2018

(30) Foreign Application Priority Data

Dec. 27, 2016   (JP) .............................. JP2016-253739

(51) Int. Cl.
*B29D 30/06*       (2006.01)
*B60C 13/02*       (2006.01)
(Continued)

(52) U.S. Cl.
CPC .......... *B29D 30/0606* (2013.01); *B60C 13/02* (2013.01); *B29D 30/0601* (2013.01);
(Continued)

(58) Field of Classification Search
CPC ............ B29D 30/0601; B29D 30/0606; B29D 30/0607; B29D 30/0629; B29D 30/68;
(Continued)

(56) References Cited

U.S. PATENT DOCUMENTS

2004/0018262 A1*   1/2004   Reep .................. B29D 30/0629
                                                425/35
2013/0330433 A1*  12/2013   Hakoshima ........ B29D 30/0606
                                                425/28.1

FOREIGN PATENT DOCUMENTS

JP            11-34060 A       2/1999
JP       2005178333 A    *   7/2005
(Continued)

OTHER PUBLICATIONS

Sachiyo Yoshida, JP-2007210248-A, machine translation. (Year: 2007).*
(Continued)

*Primary Examiner* — Robert C Dye
*Assistant Examiner* — Sedef E Paquette
(74) *Attorney, Agent, or Firm* — Westerman, Hattori, Daniels & Adrian, LLP

(57) ABSTRACT

Provided is a tire vulcanization mold which includes a sector mold configured to mold a tread portion; and a pair of upper and lower side plates positioned on an inner diameter side of the sector mold and configured to mold side wall portions, the sector mold and the pair of upper and lower side plates being configured to engage with each other by fitting engagement by way of fitting portions which opposedly face each other in a radial direction. At least either one of the sector mold and the side plate has: a recessed portion extending from each fitting surface in a tire radial direction and indented outward in a tire width direction; and a saw cut groove having a groove shape extending in a tire radial direction along at least one of an edge portion and a corner portion of the recessed portion and communicating with the fitting surface.

6 Claims, 8 Drawing Sheets

(51) Int. Cl.
   *B60C 13/00*   (2006.01)
   *B60C 11/01*   (2006.01)
   *B29D 30/68*   (2006.01)
   *B29D 30/72*   (2006.01)

(52) U.S. Cl.
   CPC .. *B29D 30/0629* (2013.01); *B29D 2030/0612* (2013.01); *B29D 2030/0617* (2013.01); *B29D 2030/685* (2013.01); *B29D 2030/726* (2013.01); *B60C 11/01* (2013.01); *B60C 13/00* (2013.01); *B60C 13/001* (2013.01); *B60C 2011/013* (2013.01)

(58) Field of Classification Search
   CPC .... B29D 2030/0612; B29D 2030/0617; B29D 2030/0616; B29D 2030/0618; B29D 2030/685; B29D 2030/726; B60C 11/01; B60C 13/00; B60C 13/001; B60C 13/02; B60C 2011/013
   USPC .................................. 152/209.16; 156/110.1
   See application file for complete search history.

(56) References Cited

FOREIGN PATENT DOCUMENTS

| | | | |
|---|---|---|---|
| JP | 2007210248 A | * | 8/2007 |
| JP | 2012-162203 A | | 8/2012 |
| JP | 2018-89849 A | | 6/2018 |

OTHER PUBLICATIONS

Toji Tsujimoto, JP-2005178333-A, machine translation. (Year: 2005).*
Office Action dated Oct. 20, 2020, issued in counterpart JP Application No. 2016-253739, with English translation (8 pages).

* cited by examiner

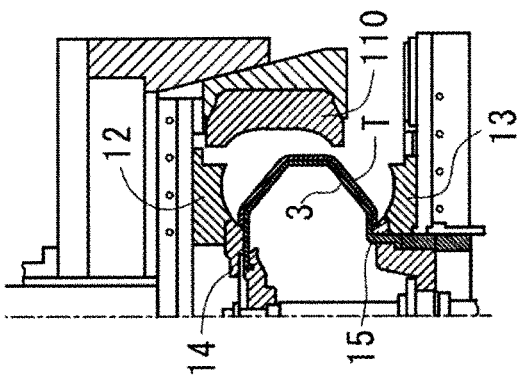
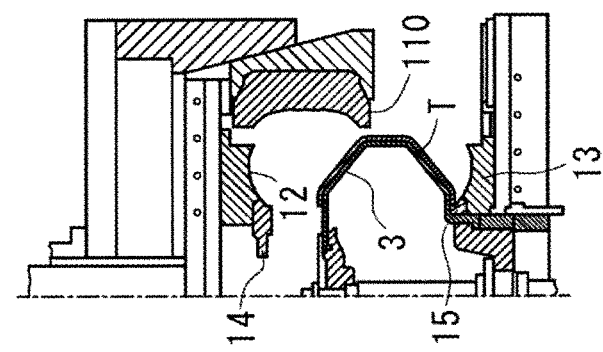
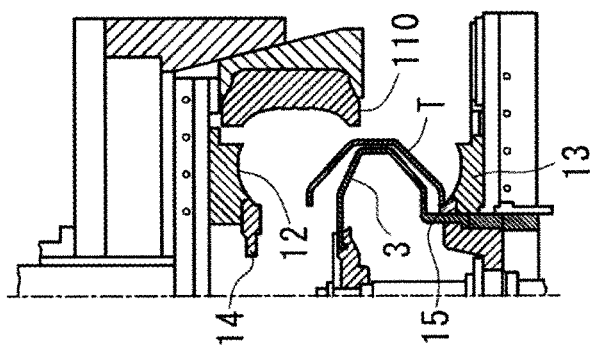

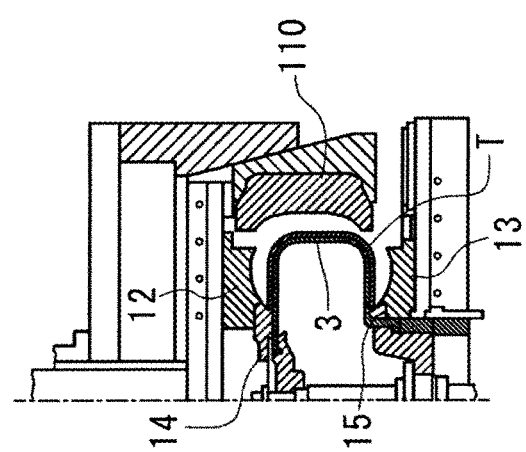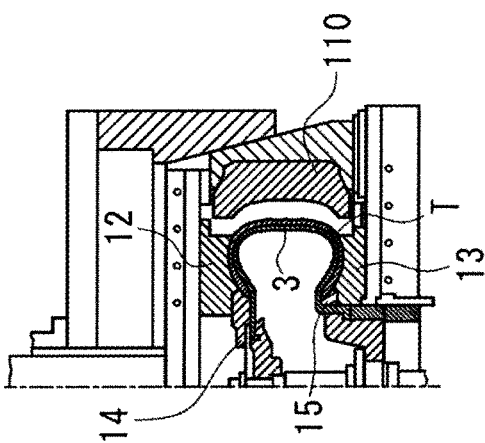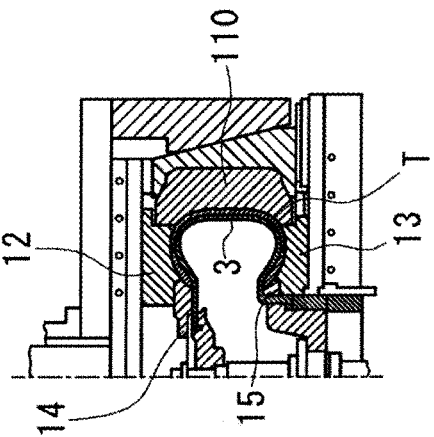

TIRE VULCANIZATION MOLD AND PNEUMATIC TIRE

CROSS-REFERENCE TO RELATED APPLICATIONS

This application claims priority of Japanese Patent Application No. 2016-253739 filed on Dec. 27, 2016, the content of which is incorporated herein by reference.

BACKGROUND OF THE INVENTION

Technical Field

The present invention relates to a tire vulcanization mold and a pneumatic tire.

Related Art

A pneumatic tire has a plurality of land portions formed of ribs or blocks which are defined by circumferential grooves and/or transverse grooves on a tread portion, for example. To this end, in a tire vulcanization mold for molding the pneumatic tire, recessed portions for molding the land portions are formed. In vulcanization molding a green tire, an air pool is liable to be formed at an edge portion or a corner portion of the recessed portion particularly because of difficulty in feeding rubber into the recessed portion having large unevenness.

JP 11-34060 A discloses a tire vulcanization mold where, for the purpose of molding land portions of a tread portion, on a bottom surface of a recessed portion formed on a tread molding surface of the mold, a main air bleed groove extending along a peripheral edge portion of the bottom surface of the recessed portion and communicating with a vent hole and an auxiliary air bleed groove formed at a center portion of the bottom surface of the recessed portion and extending in a tire width direction are formed, and the auxiliary air bleed groove is made to communicate with the main air bleed groove. With this tire vulcanization mold, on the bottom surface of the recessed portion, air present in the peripheral edge portion of the bottom surface of the recessed portion is discharged to the vent hole through the main air bleed groove, and air present at the center portion of the bottom surface of the recessed portion is discharged to the vent hole from the main air bleed groove through the auxiliary air bleed groove.

SUMMARY

In the tire vulcanization mold described in JP-A-11-34060, air is eventually discharged from the vent hole. Accordingly, to make the air bleed grooves communicate with the vent hole, it is necessary to form the air bleed grooves at the peripheral edge portion or the center portion of the bottom surface of the recessed portion. Accordingly, passage for discharging air from the recessed portion becomes complicated. Accordingly, in suppressing the generation of an air pool in the recessed portion, there is still a room for improvement from a viewpoint of simplifying the air discharge passage for discharging air.

Accordingly, it is an object of the present invention to provide a tire vulcanization mold capable of suppressing the generation of an air pool in a recessed portion while simplifying an air discharge passage for discharging air from the recessed portion, and a pneumatic tire manufactured by using the mold.

According to an aspect of the present invention, there is provided a tire vulcanization mold including:

a sector mold configured to mold a tread portion; and a pair of upper and lower side plates positioned on an inner diameter side of the sector mold, the side plates configured to mold side wall portions, the sector mold and the pair of upper and lower side plates being configured to engage with each other by fitting engagement by way of fitting surfaces which opposedly face each other in a radial direction, wherein at least either one of the sector mold or the side plates has:

a recessed portion extending from each fitting surface in a tire radial direction and indented outward in a tire width direction; and a saw cut groove having a groove shape extending in a tire radial direction along at least one of an edge portion and a corner portion of the recessed portion and communicating with the fitting surfaces.

According to the present invention, the saw cut groove extends along the edge portion and/or the corner portion of the recessed portion such that the saw cut groove communicates with the fitting surfaces. Accordingly, during vulcanization molding, air present in the edge portion and/or the corner portion of the recessed portion can be effectively discharged to a fitting surface side through the saw cut groove. Further, the air discharge passage for discharging air from the recessed portion can be formed by making the saw cut groove communicate with the fitting surfaces and hence, the air discharge passage can be simplified without the formation of a vent hole. Accordingly, the generation of an air pool in the recessed portion can be suppressed while simplifying the air discharge passage from the recessed portion.

It is preferable that the saw cut groove be formed on the side plate.

With such a configuration, the saw cut groove extends toward the fitting surfaces and toward an outer diameter side in a tire radial direction in the side plate. In the so-called segmented mold having the sector mold and the side plate, rubber in the side wall portion pressed by the side plate during a mold fastening operation easily moves outward in a tire radial direction. That is, during a mold fastening operation, the flow of rubber in the side wall portion agrees with the direction that the saw cut groove extends toward the fitting surfaces and hence, rubber is easily introduced into the saw cut groove. As a result, the flow of rubber into the edge portion and the corner portion of the recessed portion can be facilitated and, at the same time, air can be effectively discharged toward a fitting surface side due to the flow of rubber in the saw cut groove.

It is preferable that the saw cut groove be formed such that a groove depth of the saw cut groove is gradually decreased toward the fitting surfaces and becomes zero at the fitting surfaces.

With such a configuration, during a mold fastening operation, the flow of rubber guided along the saw cut groove is guided inward in a tire width direction as the flow of rubber is directed toward the fitting surfaces. Accordingly, it is possible to suppress the introduction of the flow of rubber guided along the saw cut groove to the fitting surfaces thus preventing biting of rubber in the fitting surfaces.

It is preferable that a groove bottom surface of the saw cut groove extend toward the fitting surfaces without passing on a stepped portion or an angled portion.

With such a configuration, during a mold fastening operation, it is possible to prevent the flow of rubber guided along the saw cut groove from receiving resistance from the bottom groove surface or from being caught by the groove bottom surface and hence, rubber can be smoothly guided to a fitting surface side.

It is preferable that a groove width of the saw cut groove is 0.3 mm or more and 1.0 mm or less.

With such a configuration, while forming the saw cut groove such that the saw cut groove is configured to less conspicuous, the pneumatic tire can sufficiently acquire an air discharge effect due to the formation of the saw cut groove. When the groove width of the saw cut groove is smaller than 0.3 mm, a volume of the groove becomes small and hence, a sufficient air discharge effect cannot be acquired. On the other hand, when the groove width of the saw cut groove is larger than 1.0 mm, in the pneumatic tire formed by vulcanization molding, a projecting ridge formed by vulcanization molding due to the formation of the saw cut groove becomes conspicuous and hence, the appearance of the pneumatic tire is lowered. Particularly, when a projecting portion due to the formation of the recessed portion is provided for decorating a side portion of the tire, lowering of appearance of the pneumatic tire caused by a conspicuous projecting ridge must become a problem.

It is preferable that a groove depth of the saw cut groove is 0.3 mm or more and 1.0 mm or less.

With such a configuration, while suppressing sticking of rubber in the saw cut groove, the pneumatic tire can sufficiently acquire an air discharge effect due to the formation of the saw cut groove. When the groove depth of the saw cut groove is shallower than 0.3 mm, a volume of the groove becomes small and hence, a sufficient air discharge effect cannot be acquired. On the other hand, when the groove depth of the saw cut groove is deeper than 1.0 mm, during vulcanization molding, there is a possibility that rubber sticks to the inside of the saw cut groove or rubber remains in the inside of the saw cut groove after vulcanization molding. In this case, it is necessary to frequently clean the tire vulcanization mold and hence, productivity of the pneumatic tire is deteriorated.

According to another aspect of the present invention, there is provided a pneumatic tire including:

a projecting portion projecting outward in a tire width direction, the projecting portion extending in a tire radial direction from a mold divisional line between a tread portion and a side wall portion or in a manner over the mold divisional line; and a projecting ridge projecting outward in a tire width direction, the projecting ridge extending along a distal-end-side corner portion and/or a proximal-end-side edge portion of the projecting portion and connected to the mold divisional line.

According to the present invention, it is possible to acquire a pneumatic tire which is vulcanization molded using the above-mentioned tire vulcanization mold. That is, in the pneumatic tire, it is possible to suppress the generation of an air pool in the distal-end-side corner portion or the proximal-end-side edge portion of the projecting portion.

According to the tire vulcanization mold and the pneumatic tire of the present invention, it is possible to suppress the generation of an air pool in the recessed portion while simplifying the air discharge passage for discharging air from the recessed portion.

BRIEF DESCRIPTION OF THE DRAWINGS

The foregoing and the other features of the present invention will become apparent from the following description and drawings of an illustrative embodiment of the invention in which:

FIGS. 5A to 5F are views conceptually showing the manner of operation of a tire vulcanization device;

DETAILED DESCRIPTION OF EMBODIMENTS

Hereinafter, an embodiment of the present invention is described with reference to attached drawings. The description made hereinafter essentially shows just one example essentially, and does not intend to limit the present invention, products to which the present invention is applied, or its applications. Further, drawings are schematically shown and hence, ratios of respective distances and the like may differ from actual ratios of distances and the like.

Figure 1:
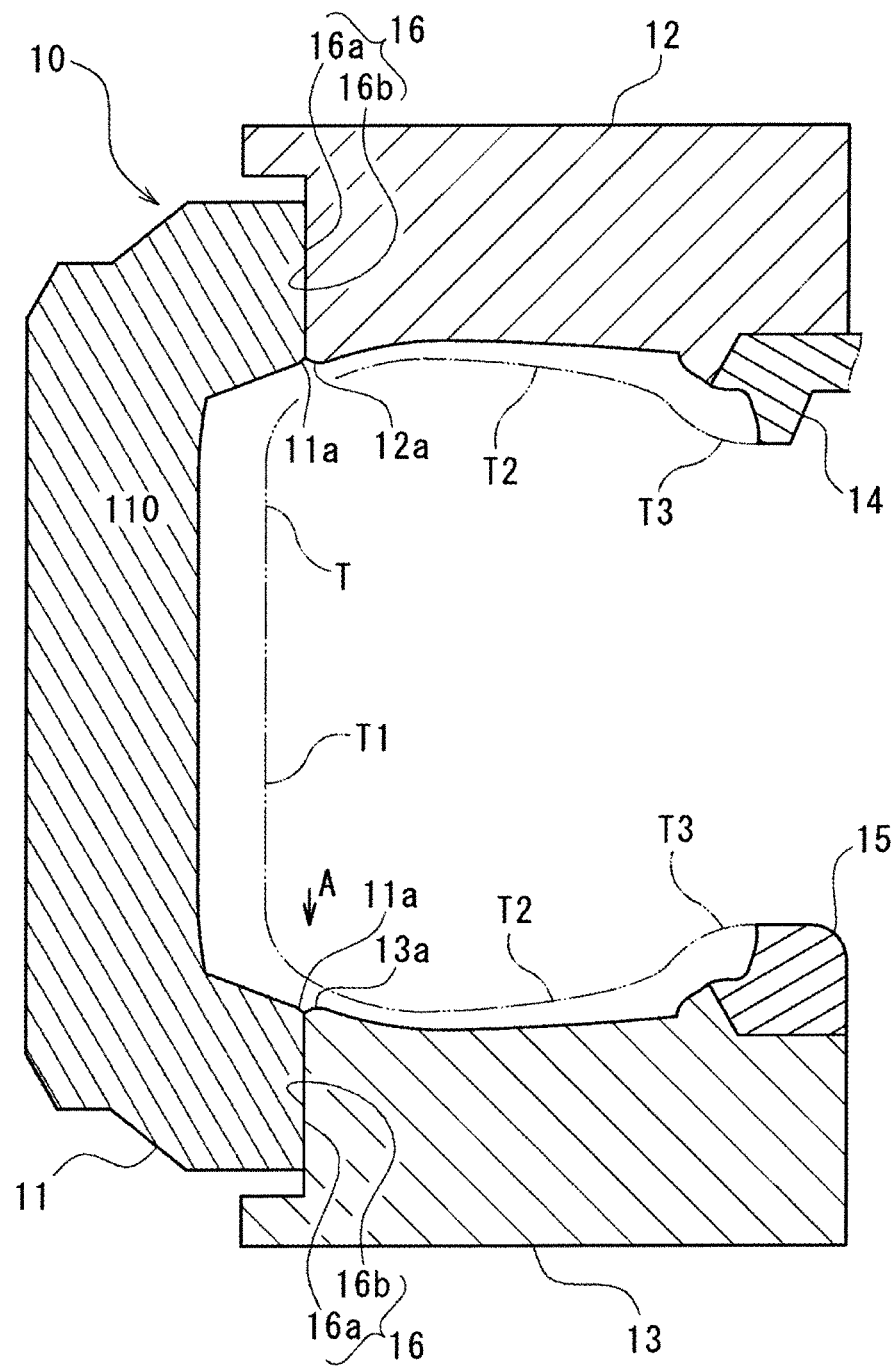
FIG. 1 is a cross-sectional view showing a schematic configuration of a tire vulcanization mold according to one embodiment of the present invention.

FIG. 1 is a cross-sectional view showing a schematic configuration of a tire vulcanization mold 10 according to one embodiment of the present invention, and FIG. 1 shows a configuration of the tire vulcanization mold 10 only on one side (a left side in FIG. 1) in a tire radial direction. As shown in FIG. 1, a green tire T is set to the tire vulcanization mold 10 such that a tire axis of the green tire T is directed in a vertical direction.

The tire vulcanization mold 10 includes: an annular sector mold 11 for forming a tread portion T1 of the green tire T; a pair of an upper side plate 12 and a lower side plate 13 positioned on an inner diameter side of the sector mold 11, and provided for forming side wall portions T2; and a pair of an upper bead ring 14 and a lower bead ring 15 mounted on inner-diameter-side end portions of the pair of upper and lower side plates 12, 13 on an inner side in a tire width direction respectively, and provided for forming bead portions T3.

The sector mold 11 is divided into a plurality of sectors 110 in a tire circumferential direction, and the respective sectors 110 are configured to move in the tire radial direction when the tire vulcanization mold 10 is opened or closed. To be more specific, the respective sectors 110 are configured to be positioned on an outer side in a radial direction and be spaced apart from each other radially in a mold open state, and are configured to move inward in a radial direction so as to be brought into contact with each other at side surface portions thereof thus forming the annular sector mold 11 in a mold fastened state. That is, the tire vulcanization mold 10 is formed as a segmented mold.

In a mold fastened state shown in FIG. 1, the sector mold 11 and the pair of upper and lower side plates 12, 13 are engaged with each other in the radial direction by fitting engagement by way of fitting portions 16. The fitting portion 16 includes: sector fitting surfaces 16a which are formed on inner-diameter-side end portions of the respective sectors 110 respectively; and a pair of upper and lower plate fitting surfaces 16b which is formed on outer-diameter-side end portions of the pair of upper and lower side plates 12, 13 respectively. These sector fitting surfaces 16a and plate fitting surfaces 16b opposedly face each other in the radial direction and are brought into contact with each other in the radial direction respectively thus forming the fitting portions 16.

The sector mold 11 has sector bent surfaces 11a which are bent outward in the tire width direction toward the fitting portions 16 (as the sector mold 11 extends inward in the tire radial direction) at an inner end portion thereof in the tire radial direction. In the same manner, the pair of the upper and lower side plates 12, 13 respectively have an upper plate bent surface 12a and a lower plate bent surface 13a which are bent outward in the tire width direction toward the fitting portions 16 (as the upper and lower side plates 12, 13 extend outward in the tire radial direction) at outer end portions thereof in the tire radial direction.

Accordingly, in a cross-sectional view shown in FIG. 1, the fitting portion 16 is formed into a beak shape indented outward in the tire width direction by the sector bent surface 11a and the upper plate bent surface 12a or the lower plate bent surface 13a.

Figure 2:
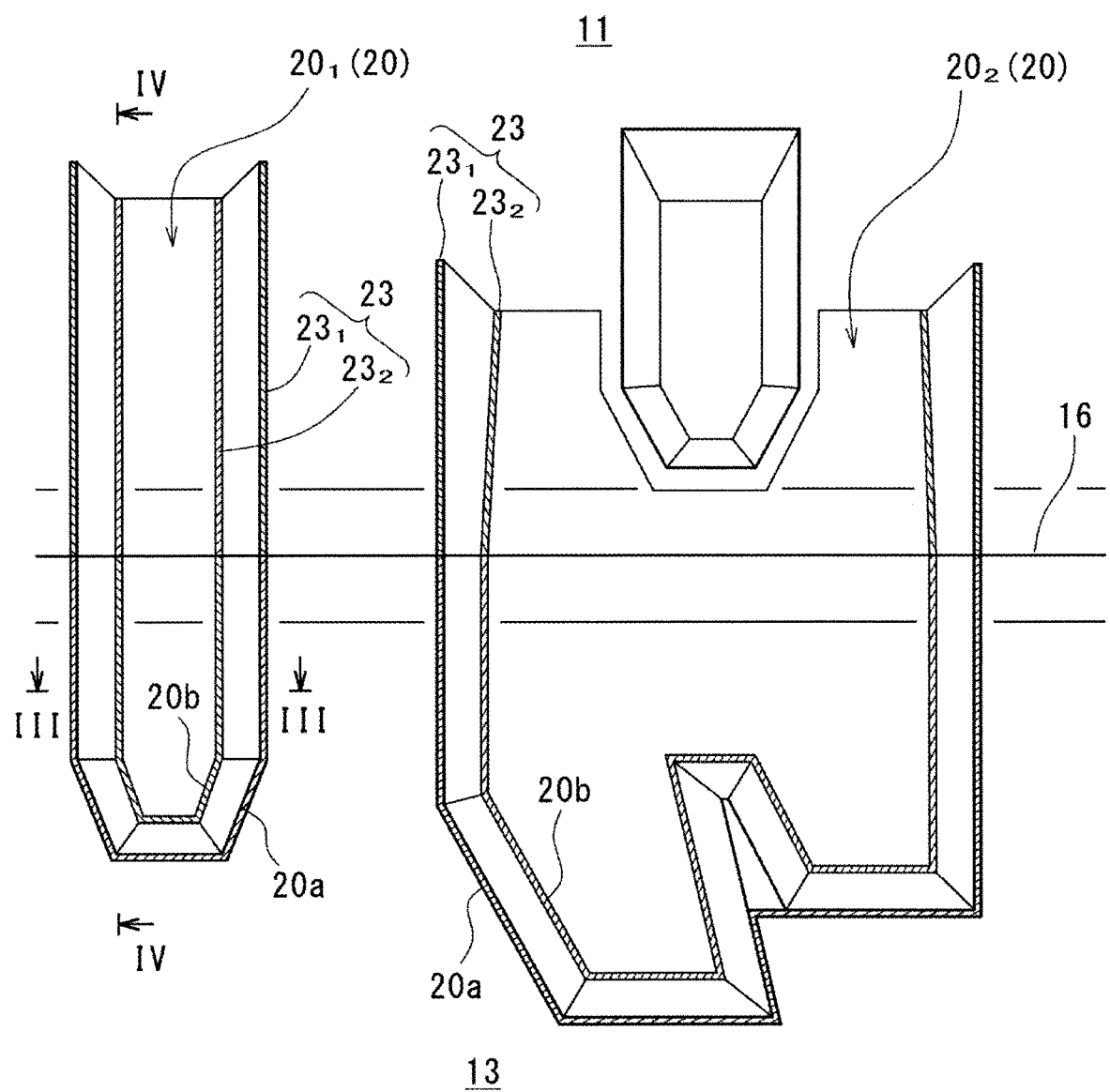
FIG. 2 is a front view of a main part of the tire vulcanization mold as viewed in a direction of an arrow A in FIG. 1.

FIG. 2 is a view as viewed in a direction of an arrow A in FIG. 1, and is a front view of a main part of the tire vulcanization mold 10 as viewed from a molding surface side where the fitting portion 16 between the sector mold 11 and the lower side plate 13 and a periphery of the fitting portion 16 in a mold fastened state is shown. As shown in FIG. 2, a plurality of recessed portions 20 which are respectively indented outward in the tire width direction are formed on the periphery of the fitting portion 16.

The recessed portion 20 is formed of: a first recessed portion $20_1$ which is formed into an approximately I shape as viewed in a front view; and a second recessed portion $20_2$ which is formed into an approximately H shape as viewed in a front view. The first recessed portions $20_1$ and the second recessed portions $20_2$ are arranged such that the first recessed portion $20_1$ and the second recessed portion $20_2$ are repeatedly and alternately in the tire circumferential direction. Both the first recessed portion $20_1$ and the second recessed portion $20_2$ extend in the tire radial direction so as to across the fitting portion 16.

Figure 3:
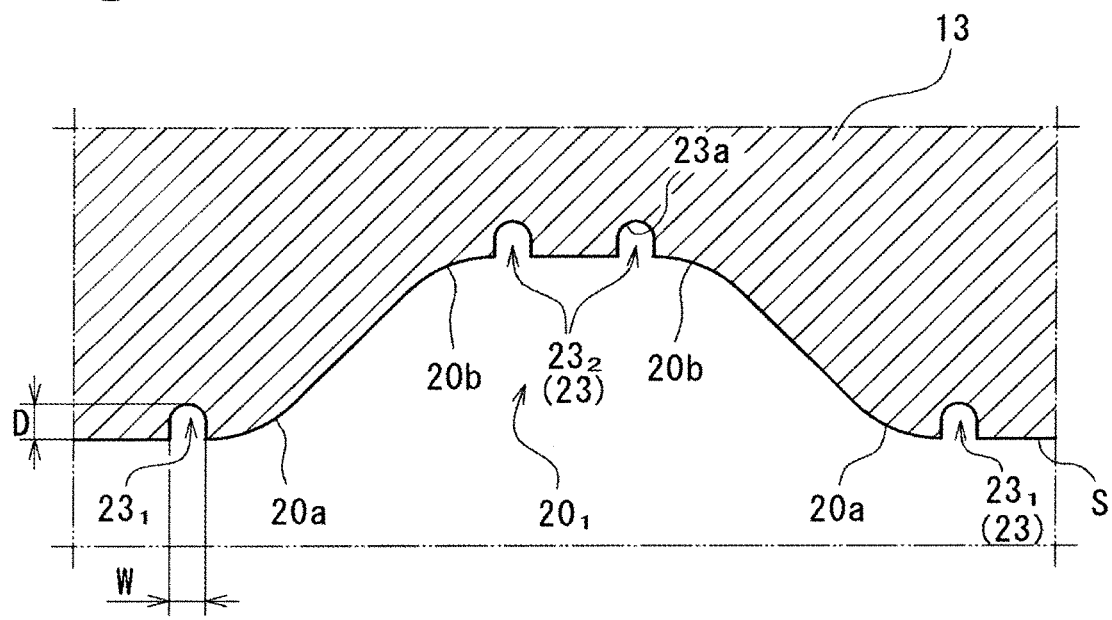
FIG. 3 is a cross-sectional view taken along line III-III in FIG. 2.

FIG. 3 is a cross-sectional view taken along line III-III in FIG. 2, and FIG. 3 is a cross-sectional view of the first recessed portion $20_1$ taken along a tire circumferential direction. Hereinafter, the recessed portion 20 is described by taking the first recessed portion $20_1$ as an example. As shown in FIG. 3, the first recessed portion $20_1$ is indented in a trapezoidal shape such that a width of the first recessed portion $20_1$ is gradually narrowed toward an outer side in the tire width direction with respect to a mold base molding surface S. The first recessed portion $20_1$ has a pair of edge portions 20a positioned on a proximal end portion side (a mold base molding surface S side), and a pair of corner portions 20b positioned on a distal end portion side. The edge portions 20a and the corner portions 20b are respectively formed into a rounded shape.

A groove-shaped saw cut groove 23 which is indented outward in the tire width direction is formed in the edge portions 20a and the corner portions 20b respectively. Also with reference to FIG. 2, the saw cut groove 23 is formed of: an edge portion saw cut groove $23_1$ which is formed along the edge portion 20a; and a corner portion saw cut groove $23_2$ which is formed along the corner portion 20b, and end portion of the edge portion saw cut groove $23_1$ and the end portion of the corner portion saw cut groove $23_2$ respectively extending in the tire radial direction are communicated with the fitting portion 16.

With reference to FIG. 3, the saw cut groove 23 is formed such that a groove width W is set to 0.3 mm or more and 1.0 mm or less and a groove depth D is set to 0.3 mm or more and 1.0 mm or less. A groove bottom portion 23a of the saw cut groove 23 is formed into a rounded shape in cross section (a semicircular shape in this embodiment).

Figure 4:
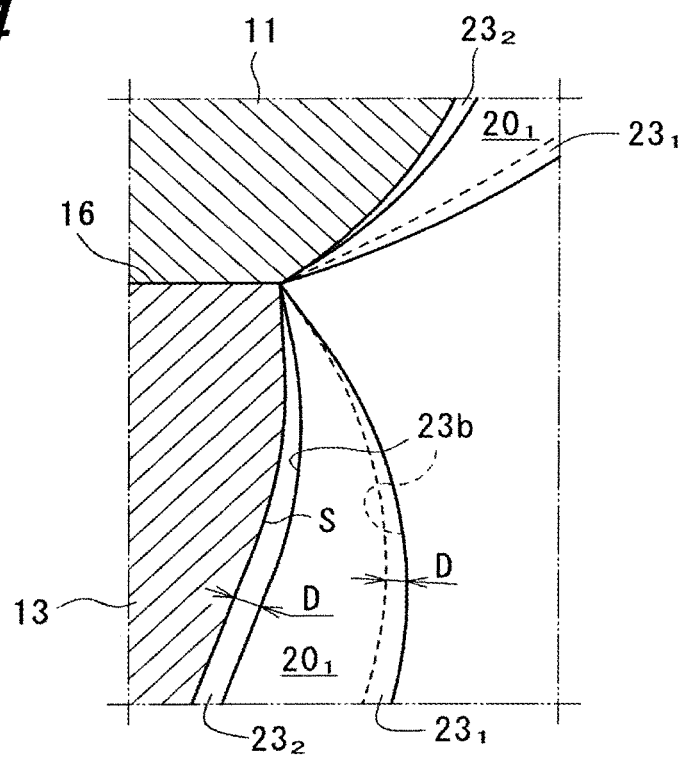
FIG. 4 is a cross-sectional view taken along line IV-IV in FIG. 2.

FIG. 4 is a cross-sectional view taken along line IV-IV in FIG. 2, and is a cross-sectional view of the first recessed portion $20_1$ in the vicinity of the fitting portion 16 taken along a tire radial direction. As shown in FIG. 4, the saw cut groove 23 is formed such that a groove depth D is gradually decreased toward the fitting portion 16 in the vicinity of the fitting portion 16. To be more specific, the saw cut groove 23 is formed such that the groove depth D is gradually decreased within a range of approximately 10 mm on an inner diameter side in the tire radial direction from the fitting portion 16 and becomes zero at the fitting portion 16. The saw cut groove 23 is also formed such that a groove bottom surface 23b extends smoothly or linearly toward the fitting portion 16 without passing on a stepped portion or an angled portion.

In this specification, "the groove depth D of the saw cut groove 23 becomes zero" means that the groove depth D is substantially zero, and when the groove depth D is 5/100 mm or less, for example, the groove depth D can be regarded as being approximately zero.

In the same manner, the saw cut groove 23 formed on a sector mold 11 side is also formed such that a groove depth D is gradually decreased within a range of approximately 10 mm on an outer diameter side in the tire radial direction from the fitting portion 16 and becomes zero at the fitting portion 16. Although not shown in the drawing, the same goes for the second recessed portion $20_2$.

Hereinafter, vulcanization molding of the green tire T performed using the above-mentioned tire vulcanization mold 10 are described with reference to FIGS. 5A to 5F.

As shown in FIG. 5A, the green tire T is placed on the lower side plate 13 in a mold open state such that a tire axis of the green tire T is directed in the vertical direction. In such a state, the green tire T is supported by the lower bead ring 15 at the bead portion T3 which forms a lower portion of the green tire T.

Next, as shown in FIG. 5B, an inner side surface of the green tire T is supported by an outer peripheral surface of the bladder 3 by inflating the bladder 3. Accordingly, the green tire T is supported by the lower bead ring 15 and the bladder 3.

Next, as shown in FIG. 5C, a mold fastening operation is started by lowering the upper side plate 12. In this mold fastening operation, firstly, the upper bead ring 14 is brought into contact with the bead portion T3 which forms an upper portion of the green tire T.

Next, as shown in FIG. 5D and FIG. 5E, along with the further lowering of the upper side plate 12, the green tire T is pressed by the pair of upper and lower bead rings 14, 15 from above and below by way of the pair of bead portions T3 so that the green tire T is deformed following the shapes of the upper side plate 12 and the lower side plate 13.

At this stage of operation, along with the lowering of the upper side plate 12, the green tire T is brought into contact with the pair of upper and lower side plates 12, 13 such that the side wall portion T2 is brought into contact with the pair of upper and lower side plates 12, 13 from a portion of the side wall portion T2 positioned on a bead portion T3 side. A portion of the side wall portion T2 on a tread portion T1 side is brought into contact with the pair of upper and lower side plates 12, 13 when the lowering of the upper side plate 12 is finished. That is, along with the lowering of the upper side plate 12, the side wall portion T2 is sandwiched from above and below by the pair of upper and lower side plates 12, 13 gradually from an inner diameter side to an outer diameter side in the tire radial direction. In other words, along with the lowering of the upper side plate 12, the side wall portion T2 is brought into contact with the pair of upper and lower side plates 12, 13 gradually from an inner diameter side to the fitting portion 16 in the tire radial direction.

Next, as shown in FIG. 5F, when the lowering of the upper side plate 12 is finished, the sectors 110 move inward in the radial direction thus forming the annular sector mold 11 and are fitted into an outer diameter side of the pair of upper and lower side plates 12, 13 so that the mold fastening operation is finished.

At this stage of operation, in the tread portion T1 of the green tire T, firstly, a center portion and both side portions of the tread portion T1 in the tire width direction are easily brought into contact with molding surfaces of the sectors 110, and the shoulder portions positioned between the center portion and the both side portions are easily brought into contact with the molding surfaces of the sectors 110 along with the radially inward movement of the sectors 110. That is, the tread portion T1 is brought into contact with sectors 110 such that, along with the radially inward movement of the sectors 110, the center portion and both side portions of the tread portion T1 in the tire width direction are firstly brought into contact with the molding surfaces of the sectors 110 and, sequentially, portions of the tread portion T1 between the center portion and both side portions are brought into contact with the sectors 110.

Figure 6:
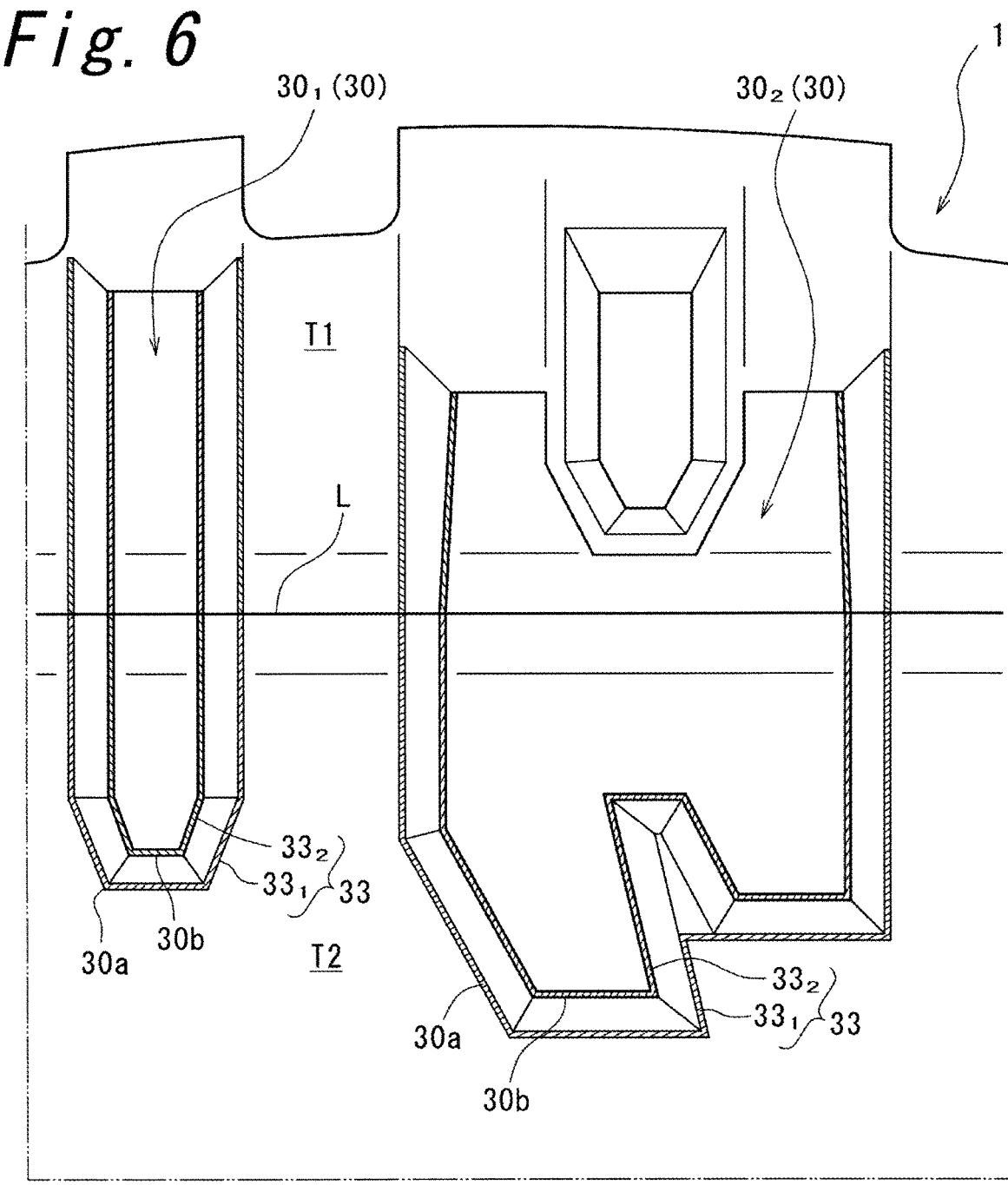
FIG. 6 is a front view showing a main part of a pneumatic tire manufactured by the tire vulcanization mold shown in FIG. 1.

As shown in FIG. 6, in the pneumatic tire 1 which is molded by the above-mentioned tire vulcanization mold 10, projecting portion 30 which projects outward in the tire width direction is formed on the pneumatic tire 1 extending between and over the tread portion T1 and the side wall portion T2. The projecting portion 30 extends in the tire radial direction so as to across a mold divisional line L which is formed by and between the sector mold 11 and the pair of upper and lower side plates 12, 13, the projecting portion 30 includes: an I-shaped first projecting portion 30$_1$ molded by the first recessed portion 20$_1$; and an H-shaped second projecting portion 30$_2$ molded by the second recessed portion 20$_2$, and the first projecting portions 30$_1$ and the second projecting portions 30$_2$ are arranged such that the first projecting portion 30$_1$ and the second projecting portion 30$_2$ are alternately and repeatedly in the tire circumferential direction.

The projecting portion 30 may be formed, for example, as an ornamental projection which decorates a tire side portion of the pneumatic tire for improving the appearance of the pneumatic tire or as a block for ensuring traction performance of the tire side portion on a muddy ground. In this embodiment, a projecting height of the projecting portion 30 is set high, for example, 2.0 mm or more and 15.0 mm or less for effectively enhancing the appearance or the traction performance of the tire.

A projecting ridge 33 which projects outward in the tire width direction is formed by the saw cut groove 23. The projecting ridge 33 includes: an edge portion projecting ridge 33$_1$ molded by the edge portion saw cut groove 23$_1$, and a corner portion projecting ridge 33$_2$ molded by the corner portion saw cut groove 23$_2$. The edge portion projecting ridge 33$_1$ is molded on a proximal-end-side edge portion 30a of the projecting portion 30, and the corner portion projecting ridge 33$_2$ is molded on a distal-end-side corner portion 30b of the projecting portion 30.

The projecting ridge 33 is molded such that a height (a projecting height from a base surface molded by the mold base molding surface S) of the projecting ridge 33 is gradually decreased as the projecting ridge 33 extends in the tire radial direction toward the mold divisional line L and becomes zero at the mold divisional line L.

The above-mentioned tire vulcanization mold 10 can acquire the following advantageous effects.

(1) The saw cut groove 23 extends along the edge portion 20a and/or the corner portion 20b of the recessed portion 20 so as to communicate with the fitting portion 16 and hence, during vulcanization molding, air present in the edge portion 20a and/or the corner portion 20b of the recessed portion 20 can be effectively discharged to the fitting portion 16 through the saw cut groove 23. Further, an air discharge passage for discharging air from the recessed portion 20 can be formed by making the saw cut groove 23 communicate with the fitting portion 16 and hence, the air discharge passage can be simplified by avoiding the formation of a vent hole. Accordingly, the generation of an air pool in the recessed portion 20 can be suppressed by facilitating discharge of air present in the edge portion 20a and the corner portion 20b of the recessed portion 20 where an air pool is liable to generate while simplifying the air discharge passage from the recessed portion 20.

(2) The tire vulcanization mold 10 is a segmented mold, and as described above, the side wall portions T2 which are pressed by the pair of upper and lower side plates 12, 13 at the time of fastening the mold are brought into contact with the pair of upper and lower side plates 12, 13 gradually from an inner diameter side in the tire radial direction to the fitting portions 16 respectively. That is, when the saw cut groove 23 is formed on the side plates 12, 13 sides, the flow of rubber in the side wall portions T2 at the time of fastening the mold agrees with the direction that the saw cut groove 23 extends toward the fitting portions 16 and hence, rubber can be easily introduced into the saw cut grooves 23. As a result, while facilitating the flow of rubber to the edge portions 20a and the corner portions 20b of the recessed portions 20, air can be more effectively discharged to the fitting portions 16 due to the flow of rubber in the saw cut grooves 23.

(3) The saw cut groove 23 is formed such that the groove depth D is gradually decreased toward the fitting portion 16 and becomes zero at the fitting portion 16. With such a configuration, the flow of rubber which is guided along the saw cut groove 23 can be guided inward in the tire radial direction toward the fitting portion 16 at the time of fastening the mold. With such a configuration, the flow of rubber which flows along the saw gut groove 23 is hard to be pulled into the fitting portion 16 and hence, biting of rubber in the fitting portion 16 can be suppressed as much as possible.

(4) The saw cut groove 23 is formed such that the groove bottom surface 23b extends to the fitting portion 16 without passing on the stepped portion or the angled portion and hence, the flow of rubber along the saw cut groove 23 can be more smoothly guided to the fitting portion 16 side while preventing the flow of rubber from receiving resistance from the groove bottom surface 23b or from being caught by the groove bottom surface 23b. With such a configuration, air can be effectively discharged to the fitting portion 16.

(5) The saw cut groove 23 is formed such that the groove width W is set to 0.3 mm or more and 1.0 mm or less and hence, a sufficient air discharge effect can be acquired while making the saw cut groove 23 inconspicuous. When the groove width W of the saw cut groove 23 is smaller than 0.3 mm, a volume of the groove becomes small and hence, a sufficient air discharge effect cannot be acquired. On the other hand, when the groove width W of the saw cut groove 23 is larger than 1.0 mm, in the pneumatic tire formed by vulcanization molding, the projecting ridge 33 molded by vulcanization molding due to the formation of the saw cut groove 23 becomes conspicuous and hence, the appearance of the pneumatic tire is lowered. Particularly, when the projecting portion 30 due to the formation of the recessed portion 20 is provided for decorating a side portion of the tire, lowering of appearance of the pneumatic tire caused by the projecting ridge 33 molded with a large width must become a problem.

(6) The saw cut groove 23 is formed such that the groove depth D is set to 0.3 mm or more and 1.0 mm or less and hence, while suppressing sticking of rubber in the saw cut groove 23, the pneumatic tire can sufficiently acquire an air discharge effect. When the groove depth D of the saw cut groove 23 is shallower than 0.3 mm, a volume of the groove becomes small and hence, a sufficient air discharge effect cannot be acquired. On the other hand, when the groove depth D of the saw cut groove 23 is deeper than 1.0 mm, during vulcanization molding, there is a possibility that rubber sticks to the inside of the saw cut groove 23 or rubber remains in the inside of the saw cut groove 23 after vulcanization molding. In this case, it is necessary to frequently clean the tire vulcanization mold 10 and hence, productivity of the pneumatic tire is deteriorated.

Figure 7A:
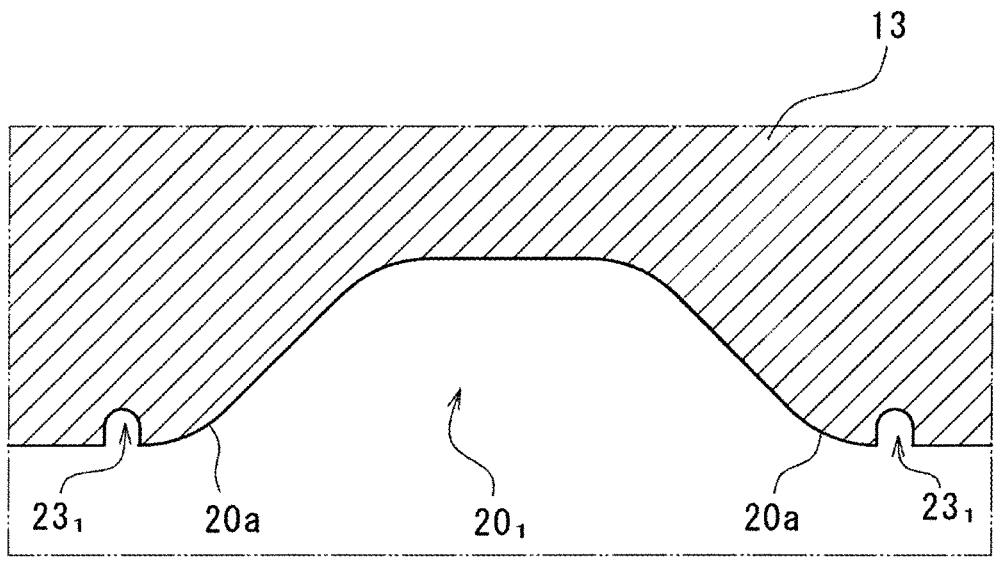
FIG. 7A is a cross-sectional view showing a modification of the embodiment where a saw cut groove is formed only on an edge portion of a recessed portion.
Figure 7B:
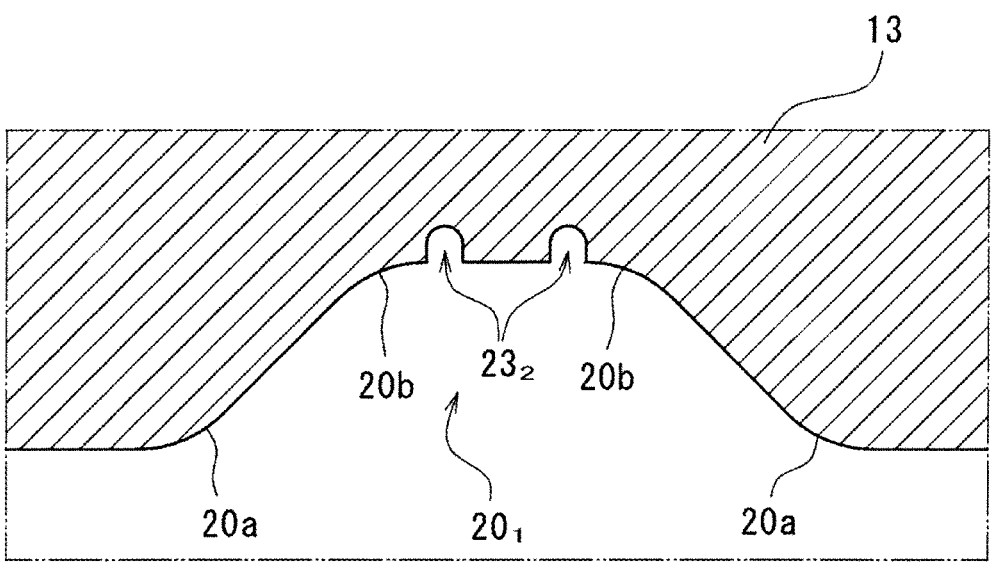
FIG. 7B is a cross-sectional view showing a modification of the embodiment where a saw cut groove is formed only on a corner portion of a recessed portion.

In the above-mentioned embodiment, although the saw cut groove 23 is formed on both the edge portion 20a and the corner portion 20b of the recessed portion 20, the present invention is not limited to such a configuration. That is, as shown in FIG. 7A, the saw cut groove 23 may be formed only on the edge portion 20a or, as shown in FIG. 78, the saw cut groove 23 may be formed only on the corner portion 20b. In all these cases, by forming the saw cut groove 23 along the edge portion 20a and/or the corner portion 20b of the recessed portion 20, the pneumatic tire formed by vulcanization molding using the mold is configured such that the projecting ridge 33 is molded by following the shape of the projecting portion 30 and hence, the lowering of appearance of the pneumatic tire can be suppressed.

Figure 8:
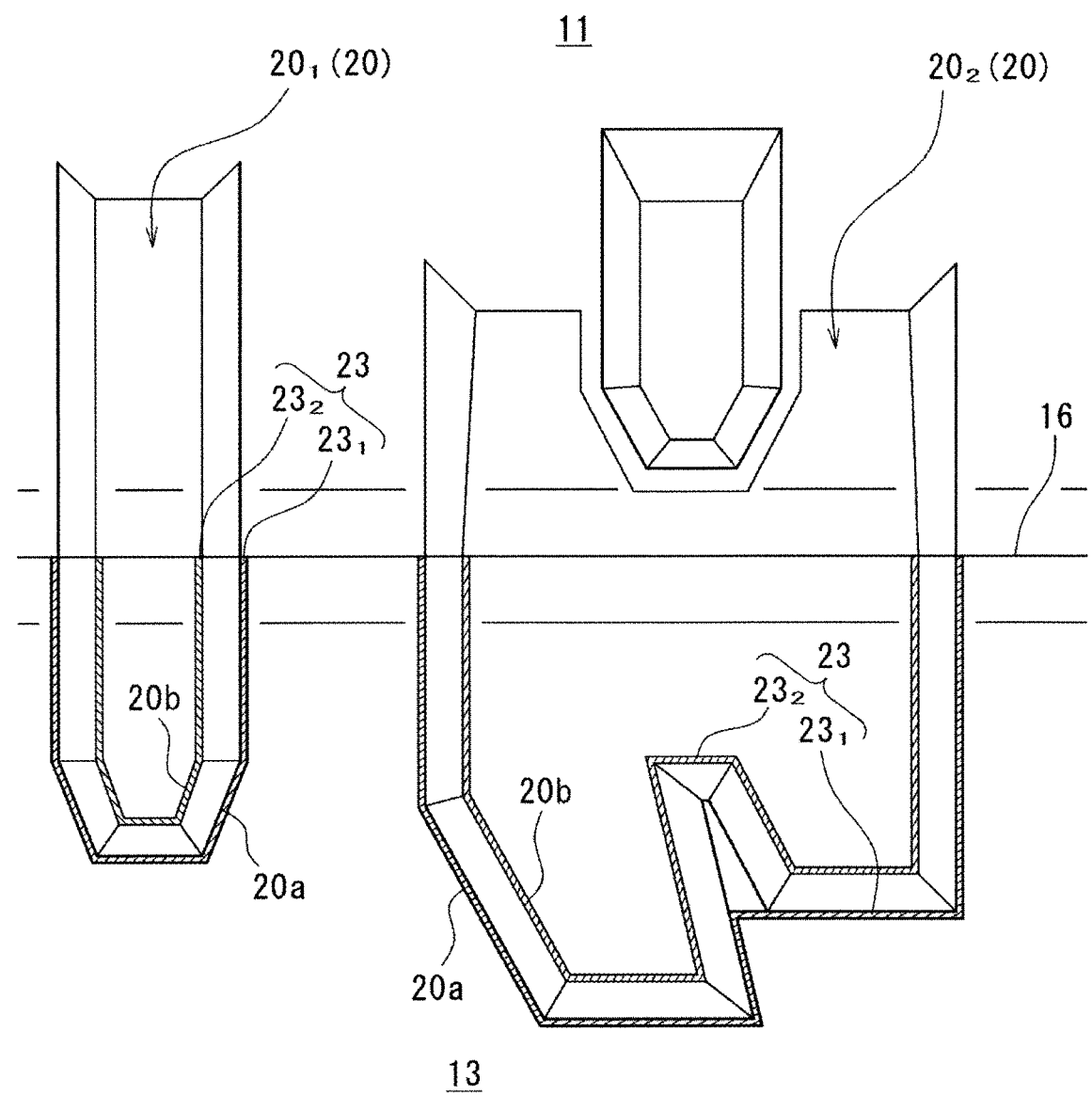
FIG. 8 is a front view of a main part showing a modification of the embodiment where a saw cut groove is formed only on a side plate.

In the above-mentioned embodiment, although the saw cut groove 23 is formed on the sector mold 11 side and the pair of upper and lower side plate 12, 13 sides, the present invention is not limited to such a configuration. That is, the saw cut groove 23 may be formed only on one of the sector mold 11 and the pair of upper and lower side plate 12, 13. In this case, by taking into account the flow of rubber in the side wall portions T2, as shown in FIG. 8, the saw cut groove 23 may be formed only on the pair of upper and lower side plate 12, 13 sides for increasing the advantageous effect acquired by the formation of the saw cut groove 23.

In the above-mentioned embodiment, although the description has been made by taking the case where the recessed portion 20 extends in the tire radial direction so as to across the fitting portion 16 as an example, the present invention is not limited to such a configuration. That is, it is sufficient that the recessed portion 20 be formed so as to be connected to the fitting portion 16. Accordingly, the present invention is also preferably applicable to a case where the recessed portion 20 is formed on either one of the sector mold 11 or the pair of upper and lower side plates 12, 13.

In the above-mentioned embodiment, although the description has been made by taking the case where the groove bottom portion 23a of the saw cut groove 23 is formed into a rounded shape as an example, the present invention is not limited to such a configuration. That is, the groove bottom portion 23a may be formed into various shapes including a triangular shape, a rectangular shape, a polygonal shape, a trapezoidal shape and the like. However, it is preferable to form the groove bottom portion 23a into a rounded shape by taking into account the flow of rubber in the saw cut groove 23.

The present invention is not limited to the configuration described in the above-mentioned embodiment, and various modifications are conceivable.

What is claimed is:

1. A tire vulcanization mold comprising:
    a sector mold configured to mold a tread portion; and
    a pair of upper and lower side plates positioned on an inner diameter side of the sector mold, the side plates configured to mold side wall portions, the sector mold and the pair of upper and lower side plates being configured to engage with each other by fitting engagement by way of fitting surfaces which opposedly face each other in a radial direction, wherein
    at least either one of the sector mold and the side plates has:
    a recessed portion extending from each fitting surface in the tire radial direction, being indented outward in a tire width direction, and including an edge portion extending in the tire radial direction on a proximal end portion side of the recessed portion and a corner portion extending in the tire radial direction on a distal end portion side of the recessed portion; and
    a saw cut groove having a groove shape extending in the tire radial direction along at least one of the edge portion and the corner portion of the recessed portion and communicating with the fitting surfaces.

2. The tire vulcanization mold according to claim 1, wherein the saw cut groove is formed on each of the pair of upper and lower side plates.

3. The tire vulcanization mold according to claim 1, wherein the saw cut groove is formed such that a groove depth of the saw cut groove is gradually decreased toward the fitting surfaces and becomes zero at the fitting surfaces.

4. The tire vulcanization mold according to claim 1, wherein a groove bottom surface of the saw cut groove extends toward the fitting surfaces without passing on a stepped portion or an angled portion.

5. The tire vulcanization mold according to claim 1, wherein a groove width of the saw cut groove is 0.3 mm or more and 1.0 mm or less.

6. The tire vulcanization mold according to claim 1, wherein a groove depth of the saw cut groove is 0.3 mm or more and 1.0 mm or less.

* * * * *